July 6, 1954     H. W. SCHULTZ     2,682,908
APPARATUS FOR BONDING BRAKE LININGS TO BRAKE SHOES
Original Filed Oct. 10, 1947
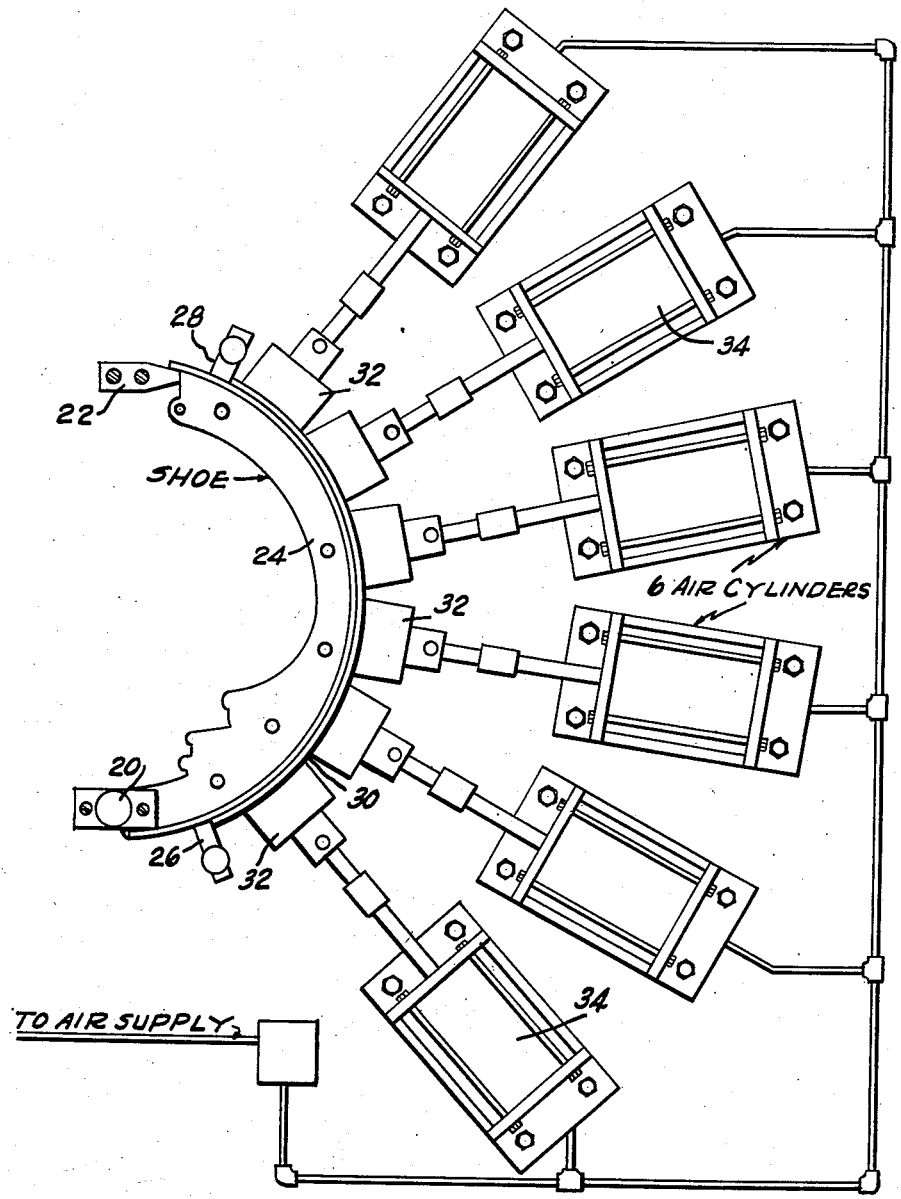
INVENTOR.
HAROLD W. SCHULTZ
BY
ATTORNEYS Patented July 6, 1954

2,682,908

UNITED STATES PATENT OFFICE 2,682,908

APPARATUS FOR BONDING BRAKE LININGS TO BRAKE SHOES

Harold W. Schultz, Dayton, Ohio, assignor to General Motors Corporation, Detroit, Mich., a corporation of Delaware Original application October 10, 1947, Serial No. 779,180. Divided and this application April 21, 1951, Serial No. 222,231

1 Claim. (Cl. 154—1)

This invention relates to an apparatus for applying brake linings to brake shoes and is particularly concerned with an apparatus for applying linings wherein the lining is cemented to the shoe preferably according to the method set forth in parent application filed October 10, 1947, Ser. No. 779,180, now Patent 2,556,709, of which this application is a division.

It is therefore an object of the invention to provide an apparatus for attaching brake linings to brake shoes wherein cement is utilized as a bonding medium and wherein no rivets or other mechanical means of attachment are utilized.

In carrying out the above object it is a further object to attach brake linings to brake shoes through the use of heat and pressure.

Further objects and advantages of the present invention will be apparent from the following description, reference being had to the accompanying drawing, which shows one type of apparatus for attaching a brake lining to a brake shoe through the use of heat and pressure.

Recent developments in automotive brakes are concerned with the use of a cement bond between the brake lining and the brake shoe. This expedient eliminates the use of rivets heretofore used and thereby increases the life of the lining two-fold since there are no rivets present to score the brake drum when the lining becomes worn and thus it is possible to utilize the lining throughout most of its entire thickness whereas in the past, these linings had to be discarded when they were approximately one-half worn out due to the presence of rivets.

While the economies of such a construction are apparent, it has been difficult to attach satisfactorily linings to shoes through the use of cement and when such expedients are used that rather critical procedures are required in order to obtain a satisfactory bond which will withstand the rigors of use and which will be sufficiently rugged to maintain the lining in complete and constant association with the shoe.

I have discovered a relatively simple method of attaching brake linings to brake shoes which is easy to execute and eliminates the critical factors heretofore present. In the application, Serial No. 694,676, now Patent 2,507,682, I have disclosed a resin type cement which is suitable for use at high temperatures and which provides an extremely strong bond. This cement is very satisfactory for bonding linings to brake shoes and will withstand all temperatures encountered in the use of the brake and likewise have sufficient strength to prevent any radial shearing of the lining from the shoe provided the lining is properly applied to the shoe.

Any other resin type cement that will withstand braking temperatures may be used. In order to accomplish this, I have designed a machine, one form of which is shown in the drawing which includes a pair of shoe locators 20 and 22 for a shoe 24. A suitable means for holding the shoe in place is also provided which holding means are not shown on the drawing. A pair of lining locators 26 and 28 are also provided which locate the lining 30 with respect to the periphery of the shoe. In order to press the lining to the shoe with suitable uniform pressures over the entire lining area, I have provided a plurality of pressure elements 32 which make up segmentally an outer pressure element which is conformed to the contour of the shoe. Each element 32 is actuated from an hydraulic or air pressure cylinder 34. In the drawing, six of such elements and cylinders are shown. It is apparent that the elements may all be actuated from a single pressure cylinder if suitable camming and levering means are provided or two of such elements may be operated from a single cylinder. All of these variations are fully within the scope of my invention. It should also be understood that I do not intend to be limited to six elements for, in some instances, fewer or more segments may be desirable. This can only be determined through actual testing of the bond obtained under the conditions of use. In any event it is apparent that the apparatus includes a segmental pressure element for pressing the lining to the shoe during at least a portion of the curing of the cement.

In the attachment of the lining to a shoe, the lining is coated with the cement in a uniform layer by roll application, brushing or spraying the cement onto the inner surface of the lining, or by any other suitable method of application. These cemented coated linings are then preferably predried for approximately fifteen minutes at 200° F. The shoes to which the linings are to be cemented are heated to a temperature of approximately 450° F. for the cement noted in the example supra, or to temperatures for any other specific cement used which will bring about a partial setup. The hot shoe is then placed in the pressure fixture and the hot predried cemented lining is positioned thereon whereupon the pressure is applied for a period ranging from ten seconds to two minutes depending on the composition of the cement. This will cause the cement to partially set up and bond the lining to the shoe. The assembled linings and shoes are then removed from the pressure fixture and are baked for from five to ten minutes at 400° F. in a suitable oven or by any other suitable heating medium in order to complete the cure. It is understood that prior to the application of the cement that both the lining and the shoe must be thoroughly cleaned to facilitate the bond. It is also to be understood that the times, temperatures and pressures mentioned herein may be varied in accordance with the characteristics of the type of cement used.

It is also apparent that other types of cements may be used if such cements will yield a bond of sufficiently high strength. In general, resin types of cements are most satisfactory for the purposes mentioned.

While the embodiments of the present invention as herein disclosed, constitute preferred forms, it is to be understood that other forms might be adopted.

What is claimed is as follows:

An apparatus for bonding brake linings to brake shoes, comprising in combination; a stationary support including; locating means for locating the brake shoe in a predetermined position on said support, and a separate means for locating the lining on the brake shoe, pressure applying means for pressing the lining to the brake shoe, said pressure applying means consisting of a plurality of individual segments each of similar arcuate shape and shaped to conform to the contour of the shoe and lining and individually movable in a direction normal to said shoe for causing uniform pressure distribution on said lining, and a plurality of independent pressure applying devices operatively connected to each of said segments for concomitantly moving said segments into pressure exerting position against a lining for pressing the lining into intimate contact with the shoe, said pressure applying devices consisting of separate pressure cylinders each of which is operatively connected to an individual segment and controlled from a common fluid line.

References Cited in the file of this patent

UNITED STATES PATENTS

| Number | Name | Date |
|---|---|---|
| 1,849,991 | Pioch | Mar. 15, 1932 |
| 2,009,265 | Hirschfield | July 23, 1935 |
| 2,417,226 | Weyant | Mar. 11, 1947 |
| 2,442,443 | Swallow | June 1, 1948 |
| 2,569,737 | Spanich | Oct. 2, 1951 |